United States Patent
Quiroz

(10) Patent No.: US 6,736,641 B2
(45) Date of Patent: May 18, 2004

(54) TEACHING METHOD AND LEARNING AID(S) TO SPEAK ANY FOREIGN LANGUAGE

(75) Inventor: Thomas Elkin Quiroz, P.O. Box 1807, West Jordan, UT (US) 84084

(73) Assignee: Thomas Elkin Quiroz, West Jordan, UT (US)

(*) Notice: Subject to any disclaimer, the term of this patent is extended or adjusted under 35 U.S.C. 154(b) by 0 days.

(21) Appl. No.: 10/347,382

(22) Filed: Jan. 21, 2003

(65) Prior Publication Data

US 2003/0143516 A1 Jul. 31, 2003

Related U.S. Application Data

(60) Provisional application No. 60/353,908, filed on Jan. 31, 2002.

(51) Int. Cl.[7] .................. G09B 19/00; G09B 19/06
(52) U.S. Cl. ............... 434/157; 434/156; 434/167; 283/46
(58) Field of Search .................. 434/157, 156, 434/167; 283/46

(56) References Cited

U.S. PATENT DOCUMENTS

| | | | | |
|---|---|---|---|---|
| 4,731,021 A | * | 3/1988 | Chan | 434/156 |
| 4,807,905 A | * | 2/1989 | Reagan | 281/15.1 |
| 5,275,569 A | * | 1/1994 | Watkins | 434/157 |
| 5,934,708 A | * | 8/1999 | Batjuk | 283/46 |
| 6,024,571 A | * | 2/2000 | Renegar | 434/157 |

* cited by examiner

Primary Examiner—Derris H. Banks
Assistant Examiner—Dmitry Suhol

(57) ABSTRACT

This teaching method uses this one-two-sided learning aid, called the ONE-PAGE-BOOK, a combination of two languages in which the syntax of the target language is set up to allow the student to learn how to speak, think, write, read and understand the target language. This portable, always accessible and easy-to-use learning aid will allow the student to spontaneously communicate within 120 hours of formal language training by just following the numerical sequence found in the learning aid. This new teaching method does not require memorization, repetition or the use of grammar as the main way to teach the target language. With the use of the learning aid no additional textbooks would be needed.

10 Claims, 2 Drawing Sheets

TEACHING METHOD AND LEARNING AID(S) TO SPEAK ANY FOREIGN LANGUAGE

CROSS-REFERENCE TO RELATED APPLICATION

This application is entitled to the benefit of Provisional Patent Application Serial No. 60/353,908 Filed Jan. 31, 2002.

BACKGROUND

1. Field of the Invention

This invention, a teaching method, used with a learning aid(s), to acquire speaking, thinking, writing, reading and understanding abilities in foreign languages, relates directly to methodologies to learn foreign languages.

2. Background and Related Art

Traditional methods of learning languages, such as using grammar, memorization, and repetition, have proven to be a failure as mankind still struggles to find a much practical, effective, and faster ways to learn foreign languages. With the use of modern technology (e.g. videos, computer programs and the like), many claim to have found better ways to learn foreign languages. Some inventors still insist in the use of traditional ways of learning languages such as memorization, or fancy devices such as microphones and the like. Where developers of these traditional and new methods fail is in understanding that speaking a language is a social not an intellectual skill!

When observing how children learn to speak their own language, they only assimilate and process the information they need to communicate at that particular time. Nowadays students of foreign language are loaded with too much grammar, too much cognitive information. This teaching method approaches the students by having them first learning the syntax of the language (the natural way native speakers speak their language,) and then its grammar. By using this approach the students actually get to speak the studied language before they start learning the grammar.

Therefore, giving the people the opportunity to learn a foreign language in a more effective and faster way will contribute greatly to mankind by opening the doors to a greater communication and understanding among individuals and nations.

SUMMARY OF THE OBJECT AND ADVANTAGES OF THE INVENTION

Accordingly, several of the objects and advantages of the teaching method and the learning aid, called ONE-PAGE-BOOK, to learn foreign languages are:

a) to provide a teaching method that radically expedites the process of learning a foreign language by allowing students to speak a foreign language within 120 hours of formal language training.

b) to provide the students with the ability to spontaneously create their own sentences to freely express their needs, wants and opinions.

c) to show and teach the student how to use monologues to help them to create useful and meaningful sentences.

d) to help the student maintain a higher degree of interest in the learning process by recreating real-life situations, and talking about topics of his/her own interest, not limiting the students to the fictitious characters found on textbooks.

e) to show the students how to actually get to speak the target language.

f) to provide a learning aid that radically simplifies the process of learning a foreign language by using a one-two-side-written sheet, instead of a textbook.

g) to provide a learning aid folded in a particular way (refer to drawings) for accessibility and portability of this always ready-to-use reference sheet.

h) to use with the learning aid one or more alphabets as needed, whether Roman, foreign or Roman equivalent.

i) to accommodate in the ONE-PAGE-BOOK any type of word list or topics such as: business, travel, religious, technical, or any other as needed.

j) to facilitate the process of learning a foreign language by using in the learning aid which contains the most basic syntax concepts necessary to speak any foreign language.

k) to discourage and avoid the tedious use of memorization, repetition, and copious grammar textbooks.

l) to increase the student's writing skills, and thinking abilities in the target language by daily writing and by using their personal experience to increase vocabulary and maintain the interest in the learning process.

Further objects and advantages are to avoid the passive learning process, such as watching videos, listening to tapes or using a computer to avoid limiting the student to depend on having access or carrying such devices at all times. Such tools promote repetition, memorization and the learning of a limited vocabulary. Such devices are rather helping tools, but by no means a way to learn foreign languages! Further objects and advantages will become apparent from studying the ensuing drawings and description.

BRIEF DESCRIPTION OF THE DRAWINGS

The foregoing aspects and advantages of the invention will become more readily appreciated, as the invention becomes better understood by reference to the following detailed description, when taken in conjunction with the accompanying drawings and actual samples of the learning aid, wherein.

Figure 1:
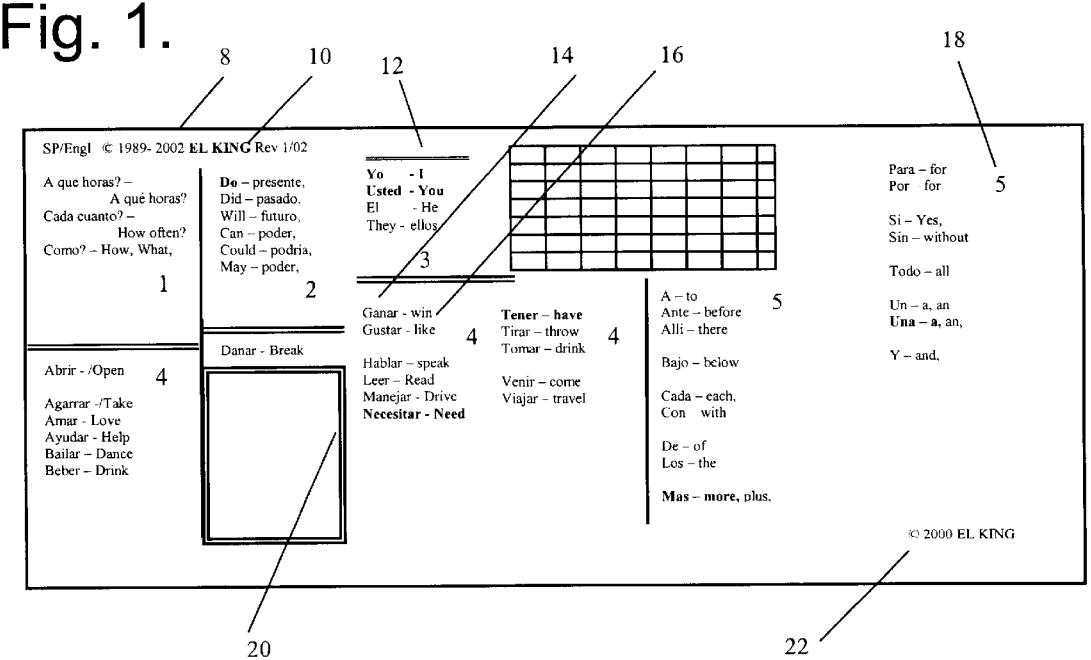
FIG. 1 FRONTAL VIEW.
Figure 2:
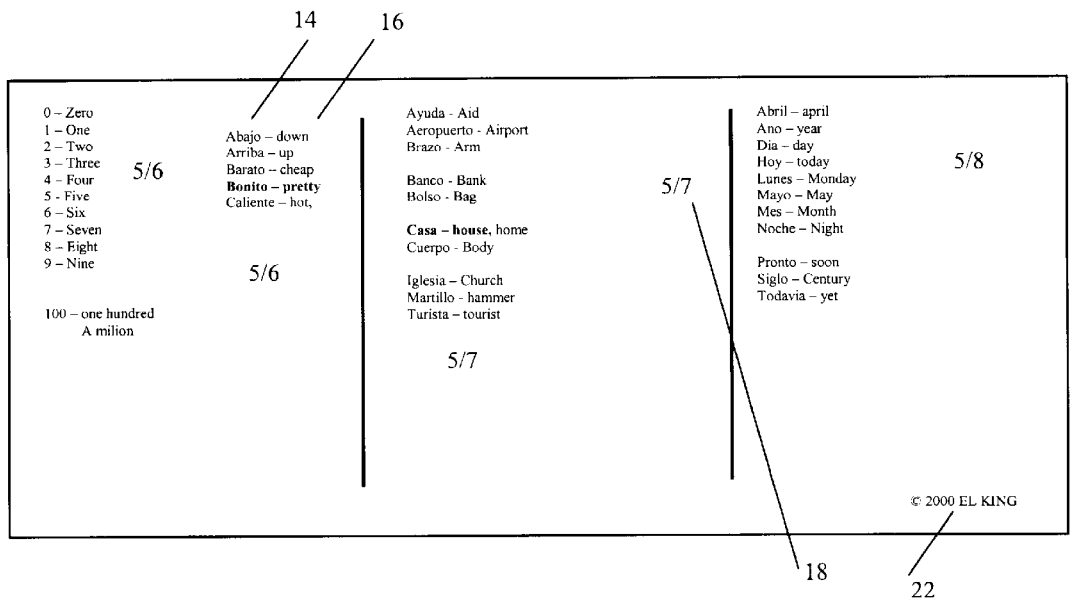
Figure 3:
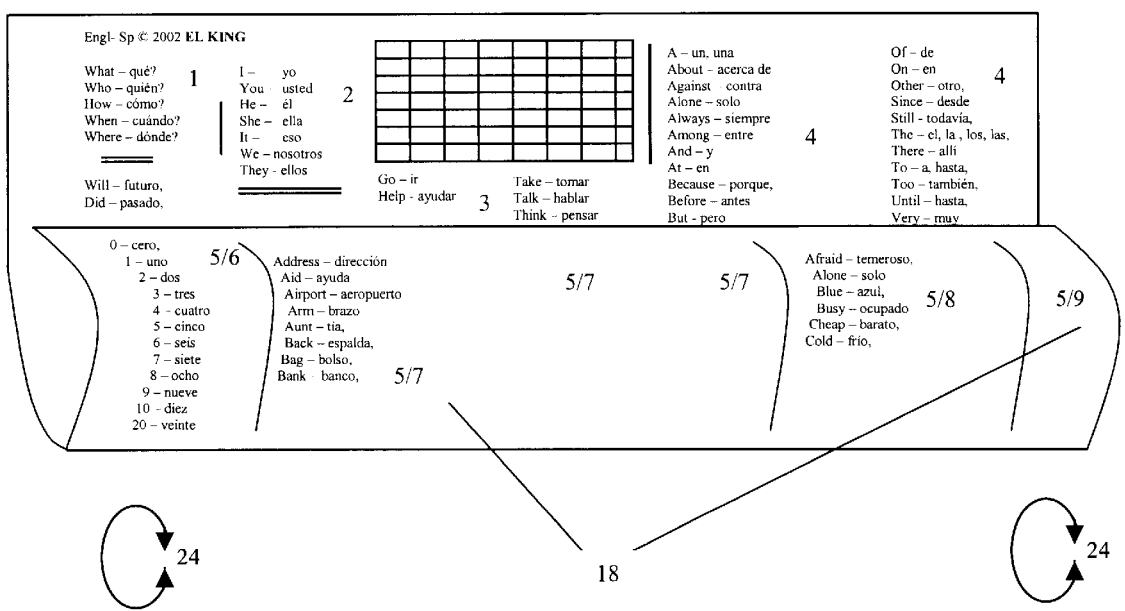
Figure 4:
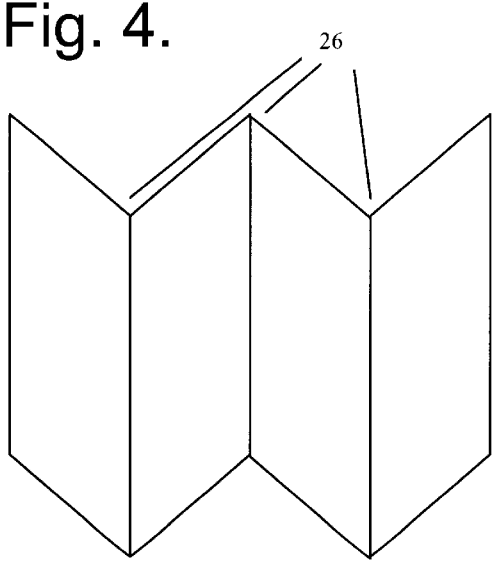
Figure 5:
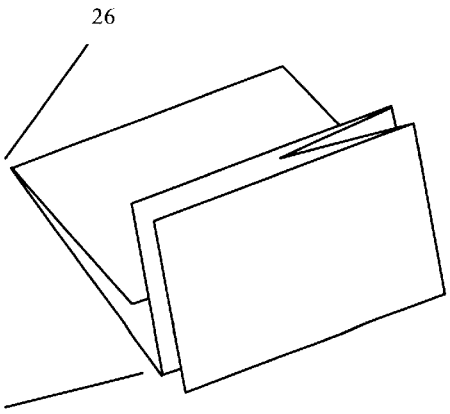

Sample illustration of the frontal view of the learning aid.

PAPER SIZE (8)—Will vary (8½ by 11 inches; 14 by 17 inches or any other custom format.)

HEADING (10)—In a fine print, abbreviation of the two languages, version and main topic.

COLUMN (12)—Includes a list of words in the first language (the student's native language) placed in alphabetical order, and its corresponding translation or transliteration of the second (target) language. Each column will be numbered following consecutive numbers.

WORD LIST (14)—Includes a varied list of words in the first language.

TRANSLATION (16)—The word list will contain the translation(s) to the second language.

NUMBER (18)—There may be as many numbers (whole or fractions) as needed.

SHAPES (20)—Some other explicative shapes may include but are not limited to: boxes, frames; symbols such as asterisks, brackets, and the like; colored and shaded elements, if necessary. Also, different font formats such as subscript, italics, bold, and underline.)

CREDITS (22)—Name of the company using the corresponding rights, copyright symbol and year of the copyright and or patent, and any other pertinent information as needed.

FIG. 2. REVERSE (OPPOSITE) SIDE

Sample illustration of the reverse side of the learning aid.

FIG. 3. FLIPPING OF THE LEARNING AID(S)

Sample illustration of the learning aid on how it must be used (flipping it over) (24) to use it correctly and for the purpose of practicality, and speed.

FIG. 4. FOLDING.

Illustration of the learning aid on how should be folded (26) correctly for the purpose of accessibility and portability.

FIG. 5. FOLDING—FINAL PRESENTATION

Sample illustration on how the learning aid will be seen after completely folded.

It should be stated with regard of the drawings that the merely illustrative of categories, symbols and elements, could and would, in actual usage, be expanded according to the criteria required by the countless possibilities of language combinations, word list, and syntaxes.

| 8 PAPER SIZE | 10 HEADING | 12 COLUMN |
| 14 WORD LIST | 16 TRANSLATION | 18 NUMBER |
| 20 SHAPES | 22 CREDITS | 24 FLIPPING |
| 26 FOLDING | | |

DETAILED DESCRIPTION OF THE INVENTION

Learning aid(s)—ONE-PAGE-BOOK

In order for a person to speak a foreign language, this teaching method must be used along with the learning aid. The learning aid can be set up using the Roman alphabet, foreign alphabets, or their Romanized equivalents. It can also be set up following the natural direction of the writing system of the studied language. For instance, if someone wants to learn Arabic, the learning aid will be written from right to left, because that's how that language is written, using the Arabic alphabet or its Romanized characters.

First, in describing the learning aid, it has a combination of indicia, e.g. columns, lists of words, numbers; shapes, symbols, colored and shaded elements, notations, and the like that could be created by a computer program. The indicia are used mainly for grammatical and phonetic purposes or for space consideration each one having a particular meaning, which may vary depending in the studied language. For instance, columns have a list of words in the first and second language. All columns are numbered. Columns typically share the same number when they list the same type of words (e.g. columns under number three (3) are for nouns, or words under number four (4) are for prepositions.) In one language question words could be number one (1) but in another language they could be number eight (8). They, of course, change depending on the structure of the second language. At times, the language structure will require the use of two columns number one (1), or two columns number two (2), or two columns number three (3), and still contain different type of words. For example in learning Spanish (refer to the pink prototype,) there are two columns number one (1), one for question words and the other one for time related words.

The word lists found in the numbered columns are always placed following the natural syntax of the second language. The listed words, in the first language and always in alphabetical order, are translated into the second language. This teaching aid(s) typically does not include words that are similar in the two languages. The reason for this is that some word similarities between the two languages are easier to remember, and also for space considerations. Following the given numerical sequence of each column, a person spontaneously will be able to create any sentence in the target language. It should be obvious that all words pertaining to a specific topic cannot be included in the learning aid required for patent.

For every language combination (the first and the second language) a ONE-PAGE-BOOK must be developed. This learning aid should be printed in such a way that when the student flips it over the second page comes up ready to be used. To facilitate its use, a folding system has been designed (refer to the drawing description.)

The learning aid in itself can be seen just as a list of words. Only when the appropriate method is used to interpret all its indicia and show the student how to use it in order to learn a foreign language, is when the learning aid gains it value, otherwise, by using it by itself will not allow the student to speak a language within the expected 120 hours.

Second, in describing the method the following steps should be followed: The instructor will introduce the student to the syntax of the second language by creating complete sentences. As more and more sentences are created the student will be exposed to the grammar of the language, including but no limiting to gender, number, and tenses.

The instructor will also teach the principle of monologue, how to ask questions, real-life situations will be re-created and colloquial expressions will be taught. All along the course the teacher will instruct the student on how to actually get to speak the language.

OPERATION OF THE INVENTION

Method

The way the teaching method is used in combination with the ONE-PAGE-BOOK is very simple. Let's say a Spanish speaker wants to learn English. The learning aid will be set up from Spanish into English. (Refer to the blue prototype.)

The instructor will ask the student in his/her own native language how he/she would say something (a complete sentence) in the second language. Let's use as example the Spanish sentence "YO TENGO UNA CASA BONITA".

a) The student will first look for the first word YO (found in column #3) and the translation will show I.

b) Once found, the student will look in the following number, number four (4) and look in alphabetical order for tener (the infinitive form of TENGO, our second word) to find have in the translation. Whenever necessary the instructor will explain any element (symbols, shapes) or grammar (conjugation, word differences.)

c) The student then looks up in the following number, five (5) looking for UNA (un), a in English.

d) When needed, the student will flip over the page (as shown in the drafting specifications) to find the next word in the following number. In this case CASA (house) is not going to be found in $5/6$ (fraction) but in $5/7$. The word BONITA (pretty) is going to be in $5/6$ instead of $5/7$. The instructor will explain why the word order is reversed, and what the difference between house and home (CASA $5/7$) is.

e) The student will then come up with the sentence "I HAVE A PRETTY HOUSE" just by following the numerical sequence 3, 4, 5, $5/6$, and $5/7$.

By using this simple approach, right from the first class the student will be able to create any complete, meaningful and useful sentence. Writing on a daily basis is at this point highly stressed. Instructors will follow this pattern (using complete sentences) and progressively introducing the student into more complex grammatical concepts while avoiding using technical words (e.g. gerund, participle, adverbs, etc.) whenever permitted.

Once the student shows ability and confidence on creating any sentence the instructor will teach the student how to ask questions. By way of example, the instructor asks the student in his/her own language: How would you say in English: ¿USTED NECESITA MAS? Then the instructor will explain that to ask questions the student must start in number one (1) or two (2). Based on the given example, the student will start in number two (2), the instructor will explain why, then:

a) The student in this case must use Do to start with the question.

b) Then the student will go to the next number, number three (3) to find USTED, you.

c) Then the student will look for number four (4) to find, in alphabetical order for NECESITAR,/Need.

d) Finally, the student will look, in alphabetical order, in the following number five (5), MAS, more, out of several options.

e) The student will then come up with the sentence "DO YOU NEED MORE?" just by following the numerical sequence 2, 3, 4, and 5.

Once the students have learned how to ask questions the class will focus more on speaking. Finally, the student will also be introduced to daily real-life situations and colloquial expressions.

The more the students use the ONE-PAGE-BOOK and exposes himself/herself to the target language (native speakers, television, reading, and so forth,) the sooner they will achieve the ability to communicate using the target language. At a point, students may find that the learning aid becomes inadequate for the level of proficiency they have reached. The teaching method will help the student develop speaking, writing, reading and understanding abilities in the second language, and also showing them how to actually get to speak the second language.

For those languages that use an alphabet other than the Roman, using at the beginning of the course a Romanized ONE-PAGE-BOOK for that language will allow the students to communicate in that language even before they learn the new alphabet.

Finally, there will be countless of different situations depending on the syntax structure of the target language, but in essence, this is how the learning aid operates.

DESCRIPTION AND OPERATION OF ALTERNATIVE EMBODIMENTS

DESCRIPTION—ONE-PAGE-BOOK

The ONE-PAGE-BOOK allows the combination of any two given languages from any family of languages (one the spoken by the student and the second one the target language). For instance, the teaching aid(s) could be set up from Chinese to Russian, Thai to Spanish, English to Japanese or any other imaginable combination. The teaching aid(s) will always be set up following the syntax structure of second language.

WORD CHOICE

There are countless possibilities of word choices (primarily, but not limited to nouns). The range or topics can go from children and military terms, to astronomy and religious jargon, and all other topics in between, all depending on the student's area of interest.

STRUCTURE

Basically, there are two main directions in which the ONE-PAGE-BOOK can be structured, from left to right and from right to left, this is based solely in they way the target language is written. A third set up could be from top to bottom.

NUMBERS

In all instances, whole and fraction numbers will be used. Numbers can go as far as needed and required by the syntax of the target language. For instance: 1, 2, 3, ¾, ⅗, ⅜, 3⁄7 and so forth; 1, 2, 3, 4, ⅕, ⅙, 4⁄7, 4⁄7, or 1, 2, 3, 4, 5, ⅚, 5⁄7, 5⁄7, ⅝ and so forth. Where to start with the fraction numbers? That solely depends in the structure of the second language. Also, numbers can be repeated. There can be two numbers one (1), two numbers two (2), and so forth.

SHAPES

Different type of shapes may be used to convey a grammatical and phonetic concepts, or for space considerations. Such shapes include but are not limited to: frames, circles, asterisks, symbols (e.g. /, @, ^, _____, #, +,) or any other that could be created by a computer program. Whenever grammar concepts should be taught, colored and shaded elements may be used.

WORD POSITION

Among the many languages spoken worldwide, some are classified as SVO (subject, verb, object,) others are classified as OVS, VSO, OSV, and SOV. So, numbers and word position will be determined depending on the syntax of the second language. For example, while some question words in some languages could be number one (1), in some other languages, they may be number eight (8), or they even may take the last or the before to last position.

PAPER SIZE, COLOR AND TEXTURE

Other formats may be used to print the learning aid as needed. Color paper might be used to differentiate one language from another. Any type of paper texture can be used, such as bond, glossy or any other fancy or security type of paper.

METHOD-GRAMMAR

The curriculum/syllabus must be introduced in an orderly manner as mentioned in the description. Briefly, the students will be introduced to one verb one meaning, one verb two or more meanings, asking questions, and by using real-life situations and colloquial expressions. However, possibilities and considerations on what to teach first will vary from one language to another. For instance, if a Chinese person wants to learn English, present, past, and past participle tenses must be taught. But if an English speaking person wants to learn Chinese, tenses are not stressed because Chinese has a different approach to tenses. Many different situations could be raised when talking about gender, morphology, cases, modes, and the like.

Thus, seeming the possible number of combinations and situations almost infinite, knowledge of at least the two languages in question will determine the criteria to be followed.

OPERATION

ONE-PAGE-BOOK AND METHOD

The inventor believes that in order to have a person speaking a foreign language within 120 hours this teaching method must be used along with the learning aid.

Operation is basically the same as stated in the specifications. Again, the numberless possibilities of language combinations give rooms to subtle changes that at the present time cannot be foreseen. The most important element is, in any given case, to know how to use and apply the method in combination with the learning aid.

SEQUENCE LISTING

Non Applicable

CONCLUSION, RAMIFICATIONS, AND SCOPE OF THE INVENTION

Thus the reader will notice that by using the teaching method in conjunction with the learning aid, the ONE-PAGE-BOOK, the invention provides a much easier and faster way to actually speak a foreign language.

While the above description contains a number of specifications, these should not be construed as limitations on the scope of the invention, but rather as exemplification of one preferred embodiment thereof. Many other variations are possible. For example, the list of verbs can vary from one language to another, eliminating some or using synonyms (duplicating); change of its presentation. Its size can also be manipulated, such as a large format to be used at a larger scale.

Accordingly, the scope of the invention should be determined not by the embodiments illustrated, but by the appended claims and their legal equivalents.

What is claimed is:

1. A learning aid for learning to speak, write, read and understand a foreign language,
   a) at least one word of a first language;
   b) at least one word of a second matched to a word of the first language;
   c) single reference sheet combining the words of the first language and the second language, the single reference sheet having two sides with word reference combinations,
   d) a plurality of consecutive alphanumeric labeled columns on the single reference sheet consisting words from the same part of speech in the first language and a corresponding translation in the second language, wherein the labeled columns are organized in a series of steps that follows the natural syntax of the second language; and
   e) a plurality of fractional section labels following the natural consecutive order of the target language in order to create basic sentences wherein fractional section labels with a linking words enable the expansion of sentences by placing a word in its natural syntax order, and the words in the fraction section labels can be repeated as many times as desired in the target language.

2. A learning aid as in claim 1, wherein the learning aid comprises a plurality of indicia adjacent to the words on the single reference sheet which convey grammatical concepts for the words in addition to a word order provided by the labeled columns.

3. A learning aid as in claim 1, wherein the learning aid comprises a plurality of indicia comprising shapes, symbols, frames, colors, and shades that convey grammatical concepts for the words in the columns.

4. A leaning aid as in claim 1, wherein the learning aid is folded to be unfolded in two movements.

5. A learning aid as in claim 1, wherein the leaning aid combines any two languages.

6. A learning aid as in claim 1 wherein the first language is written in alphabets selected front the groups consisting of Roman, foreign, and Roman equivalents.

7. A learning aid as in claim 1, further comprising a list of words tailored to an individual subject to specifies as needs, desires, and topics of interest demand.

8. A teaching method designed to be used in conjunction with a learning aid of claim 1 to expedite the ability to communicate in a foreign language, said teaching method comprising:
   a) instructing a student to create sentences by following an alphanumeric sequence and fractional section numbering on a single reference sheet learning aid;
   b) instructing the student to use the fractional columns numbering to create expandable sentences using linking words in the fractional section labels;
   c) instructing the student to repeat the use of the fractional columns labels as many times as desired to place words in their natural syntax order in the target language;
   d) instructing the student on the application of grammar using a plurality of indicia adjacent to the words on the single reference sheet;
   e) introducing verbs to the student that have only one meaning in a target language using the single reference sheet; and
   f) training the student about verbs having more than one meaning in the target language using the single reference sheet; and
   g) using the learning aid to ask questions in the target language by referencing a numbered column that contains question words in the correct language syntax location.

9. A teaching method as in claim 8, re-creating real-life situations and personal interests to said student, where said student may use said learning aid to practice and hone skills.

10. A teaching method as in claim 8, further comprising the step of providing said learning aid is flipped over to expedite its use by placing the opposite side of said learning aid up-side down, while following the consecutive numbers to make sentences expandable.

* * * * *